United States Patent
Wijnands et al.

(10) Patent No.: US 8,982,881 B2
(45) Date of Patent: *Mar. 17, 2015

(54) UPSTREAM LABEL ALLOCATION ON ETHERNETS FOR MP2MP LSPS

(71) Applicant: Cisco Technology, Inc., San Jose, CA (US)

(72) Inventors: Ijsbrand Wijnands, Leuven (BE); Arjen Boers, Sitges (ES)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,379

(22) Filed: Sep. 30, 2013

(65) Prior Publication Data

US 2014/0079068 A1 Mar. 20, 2014

Related U.S. Application Data

(63) Continuation of application No. 13/181,726, filed on Jul. 13, 2011, now Pat. No. 8,547,976, which is a continuation of application No. 11/876,365, filed on Oct. 22, 2007, now Pat. No. 8,064,441.

(60) Provisional application No. 60/906,173, filed on Mar. 9, 2007.

(51) Int. Cl.
*H04L 12/28* (2006.01)
*H04L 12/56* (2006.01)
*H04L 12/723* (2013.01)
(Continued)

(52) U.S. Cl.
CPC .............. *H04L 45/502* (2013.01); *H04L 45/04* (2013.01); *H04L 45/50* (2013.01); *H04L 45/60* (2013.01)

USPC .......................................... 370/389; 370/401

(58) Field of Classification Search
CPC ......... H04L 45/04; H04L 45/50; H04L 45/60; H04L 45/502
USPC ......... 370/390, 389, 401, 392, 395.53, 395.5, 370/395.51, 400
See application file for complete search history.

(56) References Cited

U.S. PATENT DOCUMENTS 6,374,303 B1 4/2002 Armitage et al.
7,023,846 B1 4/2006 Andersson et al.
(Continued)

OTHER PUBLICATIONS

Imaizumi, H., et al.: "FMERHR: An Alternative Approach to Multi-Path Forwarding on Packet Switched Networks," Networks, 2005.
(Continued)

*Primary Examiner* — Chuong T Ho
(74) *Attorney, Agent, or Firm* — Campbell Stephenson LLP

(57) ABSTRACT

An apparatus or method for upstream label allocation on LANs for multipoint (MP) label switched paths (LSPs). In one embodiment of the method, a first router receives a first incoming labeled data packet, wherein the first incoming labeled data packet comprises a first data packet and one or more first labels. The first router creates a first outgoing labeled data packet, wherein creating the first outgoing labeled data packet includes the step of swapping the one or more first labels of the first incoming labeled data packet with a context label and a forwarding label, wherein the first outgoing labeled data packet comprises the first data packet, the context label, and the forwarding label. Ultimately, the first router transmits the first outgoing labeled data packet to second and third routers via a LAN.

11 Claims, 8 Drawing Sheets

(51) Int. Cl.
*H04L 12/715* (2013.01)
*H04L 12/773* (2013.01)

(56) References Cited

U.S. PATENT DOCUMENTS

| | | | |
|---|---|---|---|
| 7,031,607 B1 | 4/2006 | Aswood Smith | |
| 7,061,921 B1 | 6/2006 | Sheth | |
| 7,068,654 B1 | 6/2006 | Joseph et al. | |
| 7,072,346 B2 | 7/2006 | Hama | |
| 7,088,721 B1 | 8/2006 | Droz et al. | |
| 7,260,097 B2 | 8/2007 | Casey | |
| 7,359,377 B1 | 4/2008 | Kompella et al. | |
| 7,430,210 B2 | 9/2008 | Havala et al. | |
| 7,564,803 B1 | 7/2009 | Minei et al. | |
| 8,064,441 B2 * | 11/2011 | Wijnands et al. | 370/389 |
| 8,547,976 B2 * | 10/2013 | Wijnands et al. | 370/389 |
| 2003/0026271 A1 | 2/2003 | Erb et al. | |
| 2003/0142674 A1 | 7/2003 | Casey | |
| 2006/0274716 A1 | 12/2006 | Oswal et al. | |
| 2007/0189291 A1 | 8/2007 | Tian | |
| 2008/0002699 A1 | 1/2008 | Rajsic | |
| 2008/0084881 A1 | 4/2008 | Dharwadkar et al. | |
| 2008/0101239 A1 | 5/2008 | Goode | |
| 2008/0172497 A1 | 7/2008 | Mohan et al. | |
| 2008/0192762 A1 | 8/2008 | Kompella et al. | |
| 2010/0124231 A1 | 5/2010 | Kompella | |

OTHER PUBLICATIONS

Aggarwal, R., and Y. Rekheter Juniper Networks; E. Rosen, Cisco Systems, Inc., "MPLS Upstream Label Assignment and Context Specific Label Space," Network Working Group, Internet Draft; Jan. 2005; pp. 1-8.

Winjnands, Ijsbrand and Bob Thomas, Cisco Systems, Inc.: Yuji Kamite and Hitoshi Fukuda, NTT Communications; "Multicast Extension for LDP," Network Working Group, Internet Draft; Mar. 2005; pp. 1-12.

* cited by examiner

LIB Table / MPLSP-Example (CLA, FLA, 1) : (NULL) } DS entry

*FIG. 3A*

LIB Table / MPLSP-Example (CLA, FLA, 1) : (DSFLE, 2) } DS entry

*FIG. 3B*

LIB Table / MPLSP-Example (CLA, FLA, 1) : (DSFLE, 2) } DS entry
(USFLB, 2 ) : (NULL) } US entry

*FIG. 3C*

LIB Table / MPLSP-Example (CLA, FLA, 1) : (DSFLE, 2) } DS entry
(USFLB, 2 ) : (CLA, FLA, 1) } US entry

*FIG. 3D*

LIB Table / MPLSP-Example (CLA, FLA, 1) : (DSFLE, 2), (DSFLD, 3 } DS entry
(USFLB, 2 ) : (CLA, FLA, 1), (DSFLD, 3) } US entry
(USFLB', 3 ) : (CLA, FLA, 1), (DSFLE, 2) } US entry

*FIG. 3E*

LIB Table / MPLSP-Example (CLA, FLA, 1) : (DSFLI, 2) } DS entry
(USFLC, 2 ) : (CLA, FLA, 1) } US entry

*FIG. 3F*

LIB Table / MPLSP-Example (NULL) : (CLA, FLA, 1) } DS entry

*FIG. 5A*

LIB Table / MPLSP-Example (DSFLA, 1) : (CLA, FLA, 3) } DS entry

*FIG. 5B*

LIB Table / MPLSP-Example (DSFLA, 1) : (CLA, FLA, 3) } DS entry
(NULL) : (USFLF, 1 ) } US entry

*FIG. 5C*

LIB Table / MPLSP-Example (DSFLA, 1) : (CLA, FLA, 3) } DS entry
(CLA, FLA, 3) : (USFLF, 1 ) } US entry

*FIG. 5D*

UPSTREAM LABEL ALLOCATION ON ETHERNETS FOR MP2MP LSPS

CROSS-REFERENCE TO RELATED APPLICATIONS

This application is a continuation of U.S. patent application Ser. No. 13/181,726, filed on Jul. 13, 2011, which is a continuation of U.S. patent application Ser. No. 11/876,365, filed on Oct. 22, 2007 (now U.S. Pat. No. 8,064,441), which claims the benefit of Provisional Patent Application No. 60/906,173, filed on Mar. 9, 2007, naming Ijsbrand Wijnands and Arjen Boers as inventors, and titled "Upstream Label Allocation on Ethernets for MP2MP LSPS." The above-referenced applications are hereby incorporated by reference in their entirety.

BACKGROUND OF THE INVENTION

Multiprotocol Label Switching (MPLS) networks are capable of transmitting multicast data packets between hosts (e.g., desk top computers, servers, etc.) of a multicast group. In MPLS networks, data packets are transmitted through a label switched path (LSP) that consists of several label switched routers (LSRs). The LSRs forward data packets based on labels attached thereto. A label is a short, fixed length (e.g., 20 bits), locally significant identifier that tells the next hop LSR how to forward the labeled packet.

BRIEF DESCRIPTION OF THE DRAWINGS

The example embodiments may be better understood, and its numerous objects, features and advantages made apparent to those skilled in the art by referencing the accompanying drawings.

FIG. 3A illustrates example label information base tables that are created in accordance with the process shown in FIGS. 2A and 2B.

FIG. 3B illustrates example label information base tables that are created in accordance with the process shown in FIGS. 2A and 2B.

FIG. 3C illustrates example label information base tables that are created in accordance with the process shown in FIGS. 2A and 2B.

FIG. 3D illustrates example label information base tables that are created in accordance with the process shown in FIGS. 2A and 2B.

FIG. 3E illustrates example label information base tables that are created in accordance with the process shown in FIGS. 2A and 2B.

FIG. 3F illustrates example label information base tables that are created in accordance with the process shown in FIGS. 2A and 2B.

FIG. 5A illustrates example label information base tables that are created in accordance with the process shown in FIGS. 4A and 4B.

FIG. 5B illustrates example label information base tables that are created in accordance with the process shown in FIGS. 4A and 4B.

FIG. 5C illustrates example label information base tables that are created in accordance with the process shown in FIGS. 4A and 4B.

FIG. 5D illustrates example label information base tables that are created in accordance with the process shown in FIGS. 4A and 4B.

DETAILED DESCRIPTION OF EXAMPLE EMBODIMENTS

Figure 1:
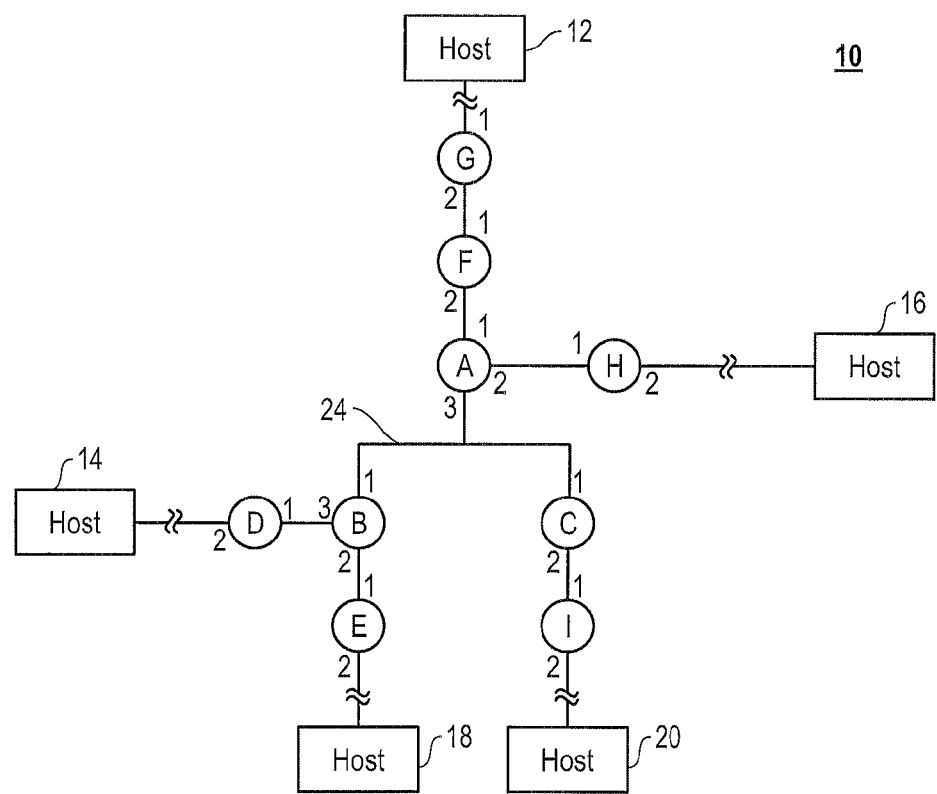
FIG. 1 is a simplified block diagram of a network.

OVERVIEW A first router receives a first incoming labeled data packet, wherein the first incoming labeled data packet comprises a first data packet and one or more first labels. The first router creates a first outgoing labeled data packet, wherein creating the first outgoing labeled data packet includes the step of swapping the one or more first labels of the first incoming labeled data packet with a context label and a forwarding label, wherein the first outgoing labeled data packet comprises the first data packet, the context label, and the forwarding label.

In general, MPLS networks consist of edge LSRs coupled together via core LSRs. Multicast data packets enter the MPLS network via ingress edge LSRs. For each data packet it receives, the ingress edge LSR identifies an existing LSP for transmitting the data packet to one or more egress edge LSRs. For multicast data packets, the ingress LSR can identity the appropriate LSP based on the packet's source and/or group IP address. Once the LSP is identified, the ingress edge LSR attaches one or more labels that are associated with the identified LSP.

A core LSR may perform a label swap operation when the core LSR receives a labeled packet. In a swap operation one or more of the packet's labels (hereinafter referred to as the incoming labels) are swapped with one or more outgoing labels mapped thereto. After the swap operation, the resulting labeled packet is forwarded to the next hop LSR of the LSP. During this swap operation, the contents of the packet below the label or labels, are not examined, which allows "protocol independent packet forwarding."

LSPs come in several forms including: point-to-multipoint (P2MP) in which labeled packets are transmitted from one ingress edge LSR to multiple egress edge LSRs, and; multipoint-to-multipoint (MP2MP) in which labeled packets are transmitted between any one of a set of edge LSRs to the other edge LSRs of the set. Certain LSRs in MP2MP or P2MP LSPs are responsible for replicating labeled data packets at each bifurcation point (the point of the MP2MP or P2MP LSP where branches fork). P2MP and MP2MP LSPs within an MPLS network are comparable to well known Protocol Indenpendent Multicast (PIM) source-specific mode (SSM) and PIM Bidirectional (Bidir) distribuion trees, respectively. Indeed, P2MP and MP2MP LSPs can be used to support the transmission of multicast data packets for PIM SSM and PIM Bidir distribution trees, respectively, coupled thereto.

P2MP LSPs are unidirectional, which means that labeled data packets flow in one direction from the ingress edge LSR (i.e., the P2MP root LSR) to multiple egress edge LSRs. In contrast, MP2MP LSPs are bidirectional; labeled data packets can flow in both directions on any given branch. Like P2MP LSPs, MP2MP LSPs have a root LSR and multiple egress edge LSRs. The big difference when compared with a P2MP LSP is that there may be multiple senders that can forward labeled data packets upstream or in the direction toward the MP2MP root LSR. In contrast packets flow only downstream or away from the root LSR of a P2MP LSP. Each of several edge LSRs in a MP2MP LSP can be an ingress edge LSR for the MP2MP LSP. While the root for a P2MP LSP is always the same as the ingress edge LSR, the root for the MP2MP can be an edge LSR, but can also be a core LSR.

P2MP or MP2MP LSPs, or branches thereof, can be formed within an MPLS network using downstream label allocation, in which an LSR informs its neighboring upstream LSR (i.e., the next LSR towards the root of the P2MP or MP2MP LSP) of a label that is allocated specifically for the LSP. LSRs can create forwarding states for an LSP based on the labels that are exchanged with their neighbors. The example embodiments will be described with reference to creating a forwarding state by creating label information base (LIB) tables in memory for mapping labels exchanged between neighbor LSRs.

Each LIB table of an LSR is typically linked to a respective P2MP or MP2MP LSP. An LIB table may include one or more entries, each of which may contain an incoming element that is mapped to one or more outgoing elements. Each incoming element may include one or more labels and an identifier of the LSR's interface coupled to a neighboring LSR. Each outgoing element may contain one or more labels allocated by a neighbor LSR, in addition to an identifier of the LSR's interface coupled to the neighboring LSR.

LSRs can use entries in their LIB tables during the swap operation described above. For example, when a core LSR receives a labeled packet from a neighbor router, the LSR may search one or more entries in its LIB tables for an incoming element that contains one or more labels that match the one or more labels attached to the received packet. If an incoming element is found that contains one or more matching labels, the LSR accesses the outgoing element mapped thereto, and swaps the one or more labels attached to the received packet with the one or more labels of the outgoing element. The resulting labeled packet is transmitted to the next LSR via the interface identifier contained in the outgoing element. If multiple outgoing elements are mapped to the incoming element, the LSR may replicate the labeled data packet it receives. Then, the LSR can swap one or more labels of each replicated labeled packet with one or more labels of a respective outgoing element, and transmit the resulting labeled packet out of the interface identified in the respective outgoing element.

LIB tables can be created in memory of LSRs, including those LSRs that are directly coupled to a local area network (LAN) within an MPLS network. The example embodiments will be described with reference to the creation and/or use of LIB tables within LSRs that are coupled to an Ethernet LAN. FIG. 1 illustrates in block diagram form, relative components of a network 10 in which labeled data packets may be transmitted between hosts via a P2MP or MP2PM LSP. Network 10 of FIG. 1 shows hosts 12-20 coupled together via an MPLS network 22, which includes LSRs A-I. As shown, hosts 12-20 are coupled directly or indirectly to LSRs G, D, H, E, and I, respectively.

Each LSR includes an interface coupled to a point-to-point communication link or a LAN (e.g., an Ethernet LAN) within MPLS network 22. For example, LSR A includes three interfaces identified as interfaces 1, 2, and 3. Interface 1 is coupled to a point-to-point communication link between LSR A and LSR F, interface 2 of LSR A is coupled to a point-to-point communication link between LSR A and LSR H, and interface 3 or LSR A is coupled to a LAN 24. For purposes of explanation only, LAN 24 will take form in an Ethernet LAN.

LAN 24 may include a switch (not shown) having a plurality of ports coupled to respective LSRs, including LSRs A-C. Each switch port is configured receive Ethernet frames, each of which may include a header with a MAC source and/or destination addresses. The switch is capable of switching a frame it receives according to the frame's MAC source and/or destination addresses. The switch of LAN 24 can switch frames that contain labeled data packets or MPLS messages (e.g., label request messages that are more fully described below) between LSRs coupled thereto. For purposes of explanation only, it will be presumed the switch floods LAN 24 with each frame that contains a labeled data packet. Thus, when the switch receives a frame containing a labeled data packet from LSR A, the switch outputs a copy of the frame to each LSR coupled thereto, including LSRs B and C; however, the switch does not output a copy of the frame containing the labeled data packet to the LSR that sent the frame. The switch need not flood MPLS messages. The switch may operate to switch a frame that contains an MPLS message to an individual destination LSR based upon the source and/or destination MAC address contained within the this frame.

LSPs or new branches thereof can be formed using downstream label allocation as noted above. In downstream label allocation, an LSR generates a label mapping message (LMM). Each LMM may contain an LSP identifier (e.g., an opaque value generated as a function of source IP address and/or a multicast group IP address) that identifies a particular P2MP or MP2MP LSP. Additionally, the LMM may contain a downstream forwarding label, an identity (e.g., an IP address) of a root LSR for the identified P2MP or MP2MP LSP, and a value (hereinafter referred to as LSP Type), which indicates whether the LSP is P2MP or MP2MP. To illustrate, presume LSR E of FIG. 1 generates and sends LMM-Example to LSR B that contains: MPLSP-Example, the identity of an example MP2MP LSP; LSP Type indicating that MPLSP-Example is a MP2MP LSP; IDG, the identity of LSR G as the root LSR for MPLSP-Example, and downstream forwarding label DSFLE that was allocated by LSR E.

Figure 2A:
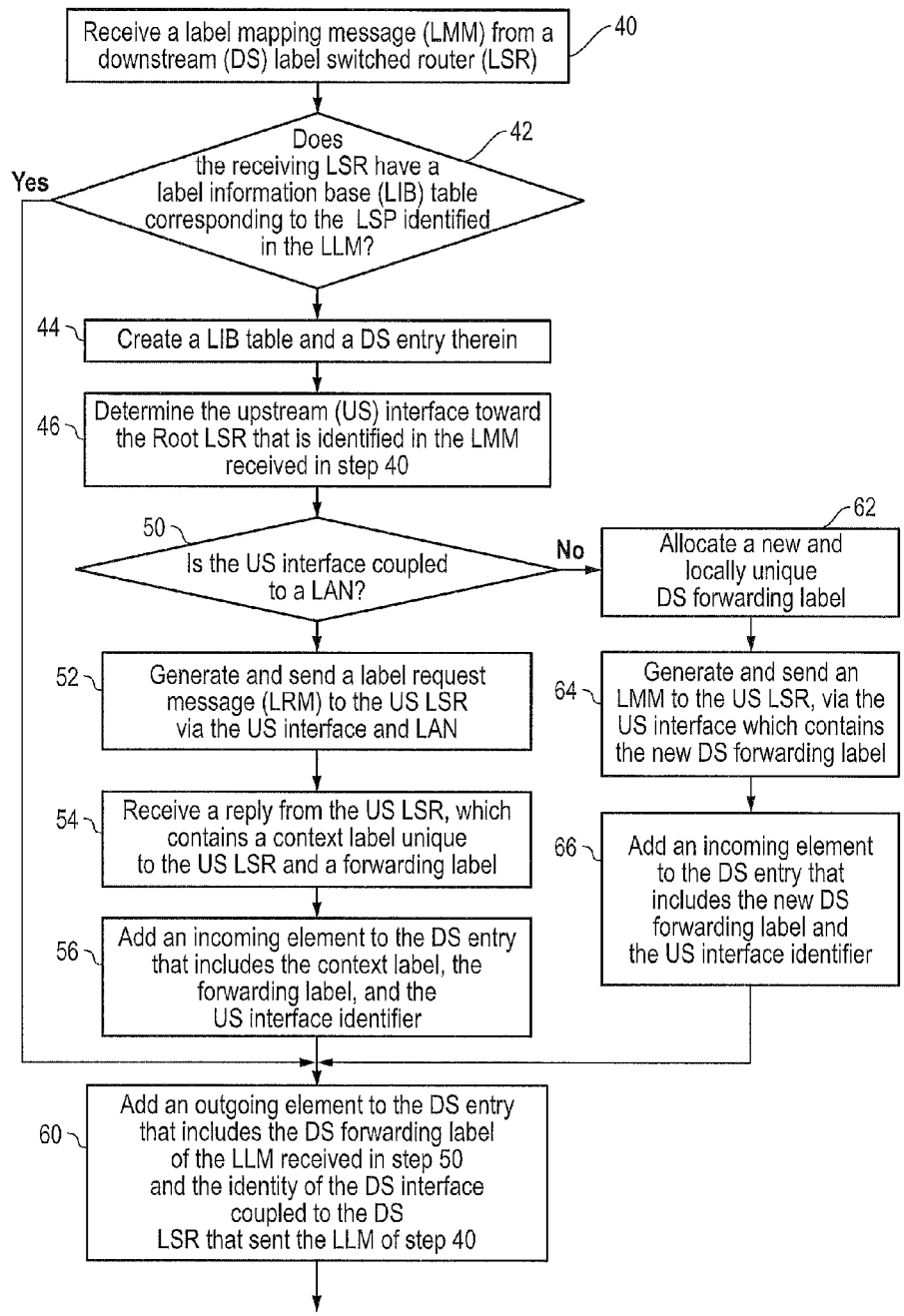
FIG. 2A is a flow chart illustrating relevant aspects of a process performed by an LSR coupled to a LAN in response to the LSR receiving a label mapping message.
Figure 2B:
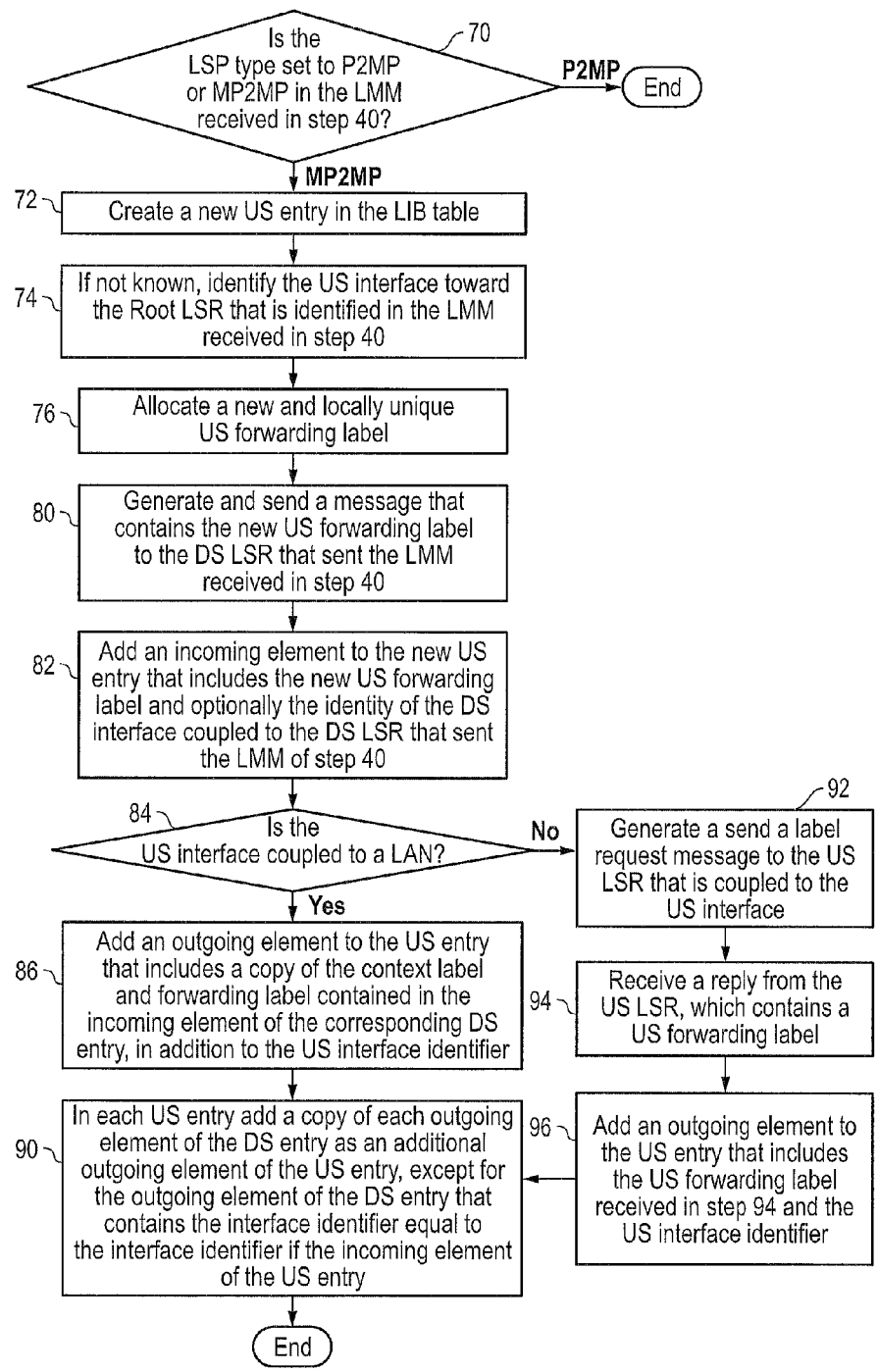
FIG. 2B is a flow chart illustrating relevant aspects of a process performed by an LSR coupled to a LAN in response to the LSR receiving a label mapping message.

LSRs coupled directly to LAN 24 may create LIB tables, and entries thereof, in response to receiving LMMs. FIGS. 2A and 2B illustrate relevant aspects of a method that may be performed by an LSR directly coupled to a LAN in response to the LSR receiving an LMM from a neighbor LSR. For ease of illustration only, the process of FIGS. 2A and 2B will be described with reference to LSR B receiving LMM-Example from LSR E.

The process shown in FIG. 2A may begin when an LSR, such as LSR B, receives an LMM, such as LMM-Example from a downstream (DS) LSR such as LSR E. The receiving LSR may determine whether it has a forwarding state for the LSP that is identified in the LMM of step 40. In one embodiment, the LSR determines whether it has a forwarding state by determining whether it has an LIB table that corresponds to the LSP that is identified in the LMM of step 40. In the illustrated example, it will be presumed that LSR B initially lacks an LIB table that corresponds to MPLSP-Example.

With continuing reference to FIGS. 1 and 2A, if the LSR (e.g., LSR B) lacks an LIB table for the identified LSP, the process may proceed to step 44 where the LSR creates an LIB table and an empty DS entry therein. In the illustrated example, because LSR B determines it lacks an LIB table that corresponds to MPLSP-Example, LSR B creates an LIB table in addition to a DS entry therein. LSR B links the LIB table it creates with MPLSP-Example.

The LSR can use the identification of the root LSR that is contained within the LMM of step 40, to identify the upstream LSR or the neighbor LSR that is topologically closest to the root LSR. Once the upstream LSR is identified, the LSR can determine the upstream interface (i.e., the interface coupled to the upstream LSR) in accordance with step 46. In the illustrated example, LSR B uses IDG, the identity of root LSR G, to identify LSR A as the upstream LSR. In accordance with step 46, LSR B determines that interface 1 is the upstream interface.

Once the upstream interface is identified, the LSR may determine whether it is coupled to a LAN in accordance with step 50. In one embodiment, each LSR coupled to the LAN will store predefined information that indicates which of its interfaces are coupled to a LAN. LSR B in the illustrated example, can access this information in step 50 to learn that upstream interface 1 is coupled to a LAN (e.g., LAN 24).

If the LSR's upstream interface is determined to be coupled to a LAN in step 50, then in accordance with step 52 the LSR may generate and send a label request message (LRM) to the upstream LSR via the upstream interface that was identified in step 46. This LRM may include information that was included in the LMM of step 40, such as the identity of the LSP, the identity of the root LSR, and the LSP Type. One of ordinary skill recognizes that the LRM may include additional information. In the illustrated example, because upstream interface 1 of LSR B is determined to be coupled to LAN 24, LSR B generates and sends LRM-Example to LSR A via interface 1 in accordance with step 52. LRM-Example should contain MPLSP-Example, IDG (the identity of root LSR G), and LSP Type set to MP2MP.

As will be more fully described below, the upstream LSR that receives the LRM, which was generated in accordance with step 52, may respond by generating and sending a reply that contains a context label unique to the upstream LSR and a forwarding label. In the illustrated example, upstream LSR A receives LRM-Example from LSR B via LAN 24, and in response LSR A generates and sends a reply to LSR B that includes context label CLA and forwarding label FLA.

The LSR should receive the reply that was sent by the upstream LSR, and in accordance with step 56 the LSR may create and add an incoming element to the DS entry of the LIB table that was created in step 44. The incoming element should include the context label and the forwarding label of the reply. The incoming element should also include the upstream interface identifier that was determined in step 46. In the illustrated example, the reply generated by LSR A is received by LSR B via LAN 24, and LSR B in turn creates and adds an incoming element to the DS entry that was created in accordance with step 44. FIG. 3A illustrates an example of the DS entry created by LSR B after it adds the incoming element in accordance with step 56. As seen, the incoming element includes context label CLA, the forwarding label FLA, and interface 1, the identity of the upstream interface that was identified by LSR B in accordance with step 46.

Returning back to step 50 of FIG. 2A, if the LSR determines the upstream interface is not coupled to a LAN, but is instead coupled to a point-to-point communication link, then the process may proceed to step 62 instead of step 52. In step 62 the LSR may allocate a new and locally unique downstream forwarding label. Thereafter, in accordance with step 64 the LSR may generate and send an LMM to the upstream LSR via the upstream interface that was identified in step 46. This LMM should contain the downstream forwarding label that was generated in step 62 in addition to the identification of the root LSR, the identification of LSP, and the LSP Type that was contained within the LMM of step 40. The upstream router can use this information to create or update its LIB table. After sending the LMM in accordance with step 64, the LSR may create and add an incoming element to the DS entry that was created in step 44. This incoming element should include the new downstream forwarding label that was generated in step 62 and the identity of the upstream interface that was determined in step 46. In the illustrated example, since the upstream interface (i.e, interface 1) of LSR B is coupled to LAN 24 as shown in FIG. 1, LSR B creates and adds the outgoing element shown in FIG. 3A in accordance with step 56.

After implementing step 56 or 66, or after determining the LSR contains the LIB table (i.e., an LIB corresponding to the LSP) at the time the LMM was received in step 40, the LSR should create and add an outgoing element to the DS entry in accordance with step 60. This outgoing element should include the downstream forwarding label that was contained within the LMM of step 40 and the identity of the downstream interface that is coupled to the downstream LSR that sent the LMM of step 40. In the illustrated example, LSR B creates and adds an outgoing element to the DS entry that includes DSFLE of LMM-Example and the identity of the downstream interface (interface 2) that is coupled to the downstream LSR (LSR E) that sent LMM-Example. FIG. 3B shows the DS entry of 3A after the outgoing element is added thereto by LSR B in accordance with step 60.

LIB tables for P2MP LSPs should contain only DS entries since P2MP LSPs are unidirectional. In contrast LIB tables for MP2MP LSPs may contain both DS entries and upstream (US) entries since MP2MP LSPs are bidirectional. The process continues to FIG. 2B, where the LSR may determine, in accordance with step 70, whether a US entry needs to be created for the LIB table, based on the LSP Type contained within the LMM of step 40. If the LSP Type is set to P2MP, the process ends since there is no need to create a US entry in the LIB table for a P2MP LSP. However, if the LSP Type is set to MP2MP, as it is in the illustrated example, the process proceeds to step 72, where the LSR may create and add a new, empty US entry to the LIB table. If the identity of the upstream interface was not known at this time, the LSR could determine the upstream interface using the identity of the root LSR that is contained within the LMM of step 40 in the same or similar fashion as described with reference to step 46 above. In the illustrated example, LSR B creates and adds a US entry to the LIB table for MPLSP-Example, since LSP Type of LMM-Example is set to MP2MP.

In accordance with step 76 the LSR may allocate a new and locally unique upstream forwarding label. In the illustrated embodiment, LSR B generates upstream forwarding label USFLB. Thereafter in accordance with step 80, the LSR may generate and send a message to the downstream LSR (i.e., the LSR sent the LMM that was received in step 40), which contains the new upstream forwarding label. The LSR then creates and adds an incoming element to the new US entry. This incoming element should include the new upstream forwarding label and optionally the identity of the downstream interface that received the LMM of step 40. In the illustrated example, LSR B creates and adds an incoming element to the new US entry it created, which contains the upstream forwarding label USFLB it allocated in accordance with step 76. FIG. 3C shows the US entry of FIG. 3B after the incoming element is added by LSR B in accordance with step 82.

The process for creating the US entry may continue with step 84 in which the LSR determines, if it hasn't already done so, whether the upstream interface is coupled to a LAN. If the upstream interface is coupled to a LAN, as it is in the illustrated example, then the process may continue with step 86 in which the LSR adds an outgoing element to the US entry, which is a copy of the incoming element of the DS entry. In the illustrated example, LSR B is coupled to LAN 24, thus prompting LSR B to create and add an outgoing element to the US entry in accordance with step 86. This outgoing element should include a copy of the context label (e.g., CLA) a copy of the forwarding label (e.g., FLA), in addition to the identity of the upstream interface (e.g., interface 1). FIG. 3D shows the US entry of FIG. 3C after LSR B adds the outgoing element in accordance with step 86.

Returning back to step 84, if the upstream interface of the LSR is determined not to be coupled to a LAN, the LSR may implement steps 92-96. More particularly, the LSR may generate and send a label request message to the upstream LSR. This label request message should include the identity of the LSR root, the identity of the LSP, and the LSP Type of the LMM received in step 40. In response to sending the label request message in step 92, the LSR should receive a reply from its upstream LSR neighbor, which contains an upstream forwarding label that was allocated by the upstream neighbor. The LSR would then create and add an outgoing element to the upstream entry of the LIB table that was created in step 72, which includes the upstream forwarding label received in step 94 and the identity of the upstream interface.

After completing step 86 or step 96 of FIG. 2B, the LSR may implement step 90 if an LIB table existed in the LSR for the LSP identified in the LMM when the LMM was received in step 40. In step 90, the receiving LSR may add a copy of each outgoing element of the DS entry to the US entry that was created in step 72, except for the outgoing element of the DS entry that contains the interface identifier that is equal to the downstream interface identifier (i.e., the identifier of the interface that received the LMM of step 40). All other existing US entries are similarly updated. Namely, for each preexisting US entry, the LSR may add a copy of each outgoing element of the DS entry as an additional outgoing element of the US entry, except for that outgoing element of the DS entry that contains an interface identifier that matches the interface identifier of the incoming element of the US entry. Once step 90 completes, the process of FIG. 2B may end. FIG. 3E illustrates the LIB table of FIG. 3D after LSR B implements the process shown in FIG. 2B in response to receiving an LMM from downstream LSR D that contains: a downstream forwarding label (DSFLD); MPLSP-Example; IDG the identity of the root LSR G for MPLSP-Example, and; LSP Type set to MP2MP. FIG. 3E shows that each outgoing element of the DS entry is added as an additional outgoing element to the newly added US entry, except for the outgoing element of the DS entry that contains interface 3, the identifier downstream interface that received the second LMM from downstream LSR D.

As noted above, the process shown in FIGS. 2A and 2B can be implemented by each LSR coupled directly to a LAN, such as LAN 24. For example, soon after LSR B implements the process shown in FIGS. 2A and 2B and creates the LIB table shown in FIG. 3D, LSR I may generate and send an LMM to LSR C. This LMM contains: MPLSP-Example; LSP Type set to MP2MP; IDG, the identification of the root LSR G for MPLSP-Example, and; a downstream forwarding label DSFLI. Because LSR C is coupled to LAN 24, LSR C will implement the process shown in FIGS. 2A and 2B in response to receiving the LMM from LSR I. FIG. 3F illustrates the LIB table created by LSR C for MPLSP-Example in accordance with the process shown in FIGS. 2A and 2B. As can be seen, the incoming elements of the DS entries in the LIB tables are identical, and the outgoing elements of the US entries in the LIB tables are identical.

As noted above, the context label (e.g., CLA) distinguishes the corresponding LSR (e.g. LSR A) coupled to a LAN (e.g., LAN 24) from other LSRs (e.g., LSRs B and C) coupled to the LAN. However, problems could arise with LSRs that connect to multiple LANs. If LSR A is coupled to a second LAN (not shown), to avoid problems LSR A may need a second context label for use on the second LAN, which is different from CLA that is used on the second LAN. In other words if LSR A is directly coupled to a pair of LANs including LAN 24, LSR A may need to be configured with two context labels CLA and CLA' that uniquely identify LSR A within the respective LANs, and which are used within the respectively LANs in accordance with the process shown in FIGS. 2A and 2B. In this embodiment, the context labels could be predetermined based upon respective addresses of the interfaces of the LSR that are coupled to the respective LANs. Alternatively, the context label assigned to LSR A may uniquely identify CLA amongst all LSRs within the MPLS network 22. If the context label is sought to be unique to the entire MPLS network, there may be no need to use an address of the interface to predetermine a context label. One simple way to create a unique context label is to statically configure it per LSR, much like the way in which router IDs are configured.

Figure 4A:
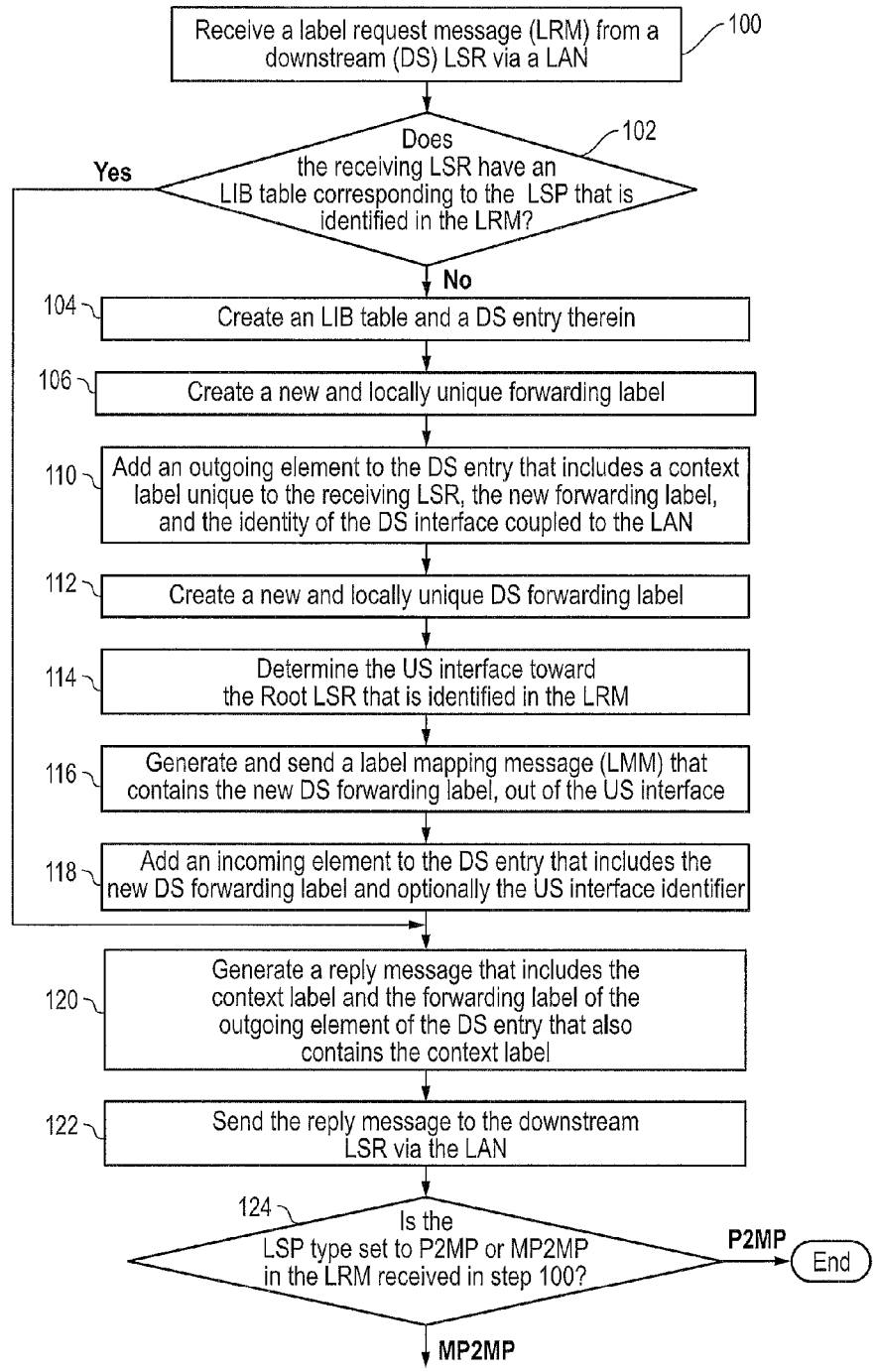
FIG. 4A is a flow chart illustrating relevant aspects of a process performed by an LSR coupled to a LAN in response to the LSR receiving a label request message.
Figure 4B:
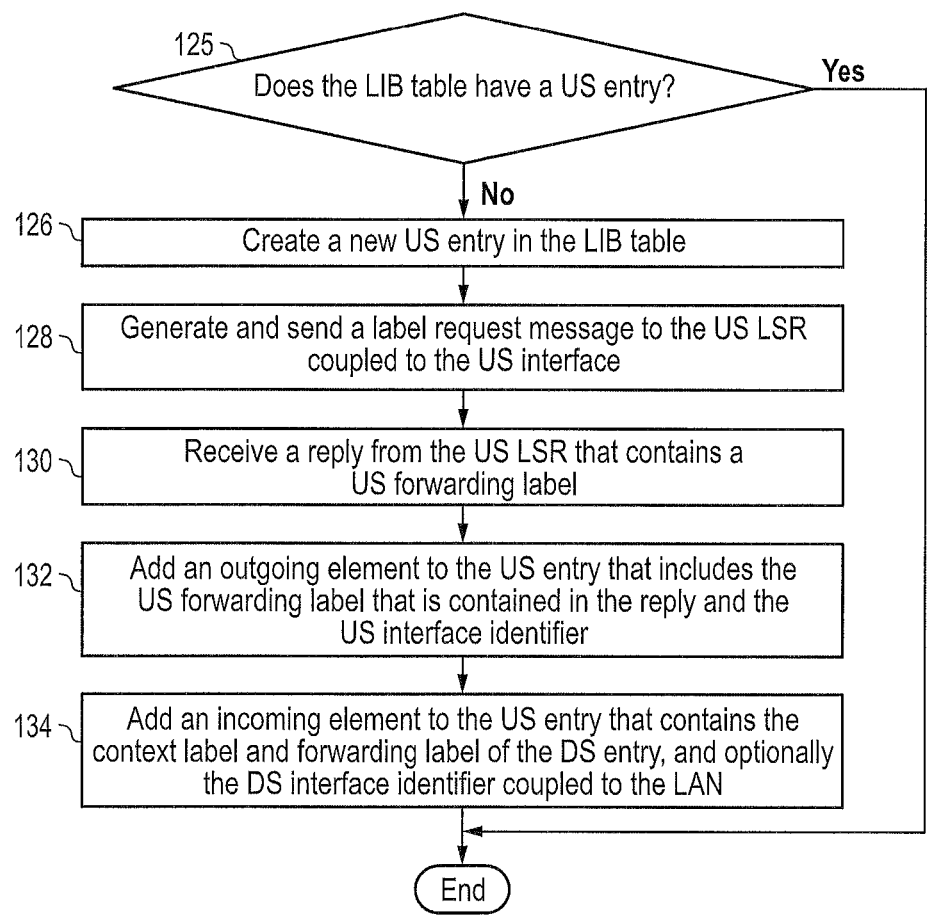
FIG. 4B is a flow chart illustrating relevant aspects of a process performed by an LSR coupled to a LAN in response to the LSR receiving a label request message.

As noted in FIGS. 2A and 2B, the upstream LSR that is coupled to the LAN, replies to the LRM that was generated and sent in step 52, and the reply contains the context label (e.g., CLA) that is unique to the upstream LSR (e.g., LSR A) and the forwarding label (e.g., FLA). FIGS. 4A and 4B illustrate in greater detail, relevant aspects of process performed by an LSR coupled to a LAN such as LAN 24 in response to receiving an LRM via the LAN. For ease of illustration only, the process of FIGS. 4A and 4B presume the LSR is coupled to a single LAN and only receives LRMs via the LAN.

The process illustrated in FIGS. 4A and 4B is implemented by the LSR in response to the LSR receiving an LRM. It is noted the LSR may store predetermined information that identifies which of its interfaces are coupled to a LAN. The LSR, when the LRM is received, may or may not have a forwarding state for the LSP identified in the LRM. In other words, the LSR may not have an LIB table that corresponds to the LSP of the LRM, when the LRM is first received. FIGS. 4A and 4B will be described with reference to LSR A receiving LRM-Example that was generated by LSR B in accordance with step 52 of FIG. 2A. For the purposes of explanation only, it will be presumed that when LSR A receives LRM-Example, LSR A does not have a forwarding state for MPLSP-Example, the identity of the LSP contained in LRM-Example.

In accordance with step 104, the LSR may create an LIB table that corresponds to the LSP identified in the LRM of step 100, if the LIB doesn't already exist. The LSR may also create an empty DS entry for the newly created LIB table in step 104. Thereafter in accordance with step 106, the LSR may allocate a new, unique forwarding label. In step 110, the LSR may create and add an outgoing element to the newly created DS entry. This outgoing element should include: the context label that is unique to the LSR; the forwarding label allocated in step 106, and; the identity of the downstream interface that received the LRM of step 100. In the illustrated example, LSR A lacks an LIB for MPLSP-Example, which is identified in LRM-Example that was received from LSR B via LAN 24. As such, LSR A creates an LIB and an empty DS entry therein. LSR A then allocates forwarding label FLA in accordance with step 106. FIG. 5A illustrates the DS entry after the outgoing element is added by LSR A in accordance with step 110.

In accordance with step 112, the LSR may allocate a locally unique DS forwarding label that it will ultimately send to the next upstream LSR toward the root LSR. In step 114, the LSR may determine the identity of the upstream interface (i.e., the LSR interface that is coupled to the upstream LSR towards the root LSR). In one embodiment, the LSR can use the identification of the root LSR, which is contained within the LRM of step 100, to identify the upstream LSR. Once the upstream LSR is identified, the LSR can determine the upstream interface (i.e., the interface coupled to the next upstream LSR). In accordance with step 116, the LSR may generate an LMM that contains the downstream forwarding label that was allocated in step 112, and this LMM is sent out of the upstream interface identified in step 114. The LSR may then create and add an incoming element to the DS entry that includes the new downstream forwarding label of step 112 and the identity of the upstream interface that was determined in step 114. In the illustrated example, LSR A allocates downstream forwarding label DSFLA in accordance with step 112. LSR A then determines that interface 1 is coupled to LSR F, which is the upstream LSR towards root LSR G, the root identified in the LRM-Example. Thereafter LSR A generates and sends an LMM to LSR F via interface 1 in accordance with step 116. This LMM contains DSFLA, in addition to other information. In accordance with step 118, LSR A creates and adds an incoming element to the DS entry that was created in step 104. FIG. 5B illustrates the DS entry of FIG. 5A after LSR A generates and adds the incoming element in accordance with step 118.

Once the incoming element is added to the DS entry in accordance with step 116, or if the LSR determines in step 102 that the LIB preexists when the LRM was received in step 100, the LSR may generate a reply message to the LRM as shown in step 114. The reply message should include the context label and the forwarding label that is contained within the outgoing element of the DS entry. As shown in step 122, the reply message may be sent to the downstream LSR (e.g., LSR B) via the LAN and the downstream interface coupled to the LAN. The reply sent in step 122 may be the same reply that is received in step 54 of FIG. 2A. In the illustrated example, LSR A generates a reply message in accordance with step 116 that includes the context label CLA and the forwarding label FLA that is contained within the outgoing element of the DS entry shown in FIG. 5B. LSR A sends this reply message to LSR B via the LAN 24.

Once the reply message is sent in accordance with step 122, the LSR may determine whether it needs to create an US entry for the LIB table. To this end, the LSR accesses the LRM that was received in step 100, to determine whether the LSP Type is set to MP2MP or P2MP. If the LSP Type is set to P2MP, there is no need to create a US entry and the process ends. However, if the LSP Type is set to MP2MP, as it is in the illustrated example, the process proceeds to step 125 to determine whether the LIB table has a preexisting US entry as the result of the LSR receiving a prior LRM via the LAN. If a prior US entry exists, the process ends. Otherwise the process proceeds to step 126. In the illustrated example, LSR A initially lacks a US entry when it receives LRM-Example. As such, LSR A would proceed to step 126. In step 126, the LSR creates and adds a new, empty US entry in the LIB table. In the illustrated embodiment, LSR A generates and adds a new, empty US entry to the LIB.

In step 128 the LSR may generate and send a label request message to the upstream LSR that is coupled to the upstream interface, which was identified in step 114 or which can be identified in the same manner described above with respect to step 114. The upstream router should respond by sending a reply that contains an upstream forwarding label. After the reply is received, the LSR may create and add an outgoing element to the US entry that was created in step 126. This outgoing element should include the upstream forwarding label that was contained in the reply message of step 126, in addition to the identifier of the upstream interface. In the illustrated example, LSR A generates and sends a label request message to upstream LSR F that is coupled to upstream interface 1. LSR A then receives a reply from LSR F that contains upstream forwarding label USFLF. FIG. 5C illustrates the LIB table of FIG. 5B after LSR A adds the outgoing element to the US entry in accordance with step 132.

In step 134, the LSR adds an incoming element to the US entry that was created in step 126. This incoming element should include the context label and forwarding label of the DS entry, and optionally the identity of the downstream interface coupled to the LAN. FIG. 5D shows the US entry of FIG. 5C with the incoming element added thereto by LSR A in accordance with step 132. The process shown in FIG. 4B may then end.

It is noted that the process shown in FIGS. 4A and 4B presume that the upstream interface of the LSR (e.g., LSR A) is not coupled to a second LAN when the LSR receives the LRM in step 100. However, if second LAN is coupled to upstream interface, then the LSR may have to implement a procedure similar to that shown in FIGS. 2A and 2B. For example, the LSR may have to implement steps 52-60 of the process shown in FIG. 2A. The LSR may also have to implement steps 86 and 90 of FIG. 2B if the LRM received in step 100 contains an LSP Type set to MP2MP.

After LIB tables are created in LSRs coupled to the LAN in accordance with the processes shown in FIGS. 2A, 2B, 4A and 4B, any of the LSRs can begin to forward labeled data packets using a swap operation similar to that described above. For example, when a LAN coupled LSR receives a labeled packet, the LSR may search one or more entries in its LIB tables for an incoming element that contains one or more labels that match the one or more labels attached to the received packet. If an incoming element is found that contains one or more matching labels, the LSR accesses the outgoing element mapped thereto, and swaps the one or more labels attached to the received packet with the one or more labels of the outgoing element. The resulting labeled packet is transmitted to the next LSR in the LSP via the interface identifier contained in the outgoing element. If multiple outgoing elements are mapped to the incoming element, the LSR may replicate the labeled data packet it receives. Then, the LSR can swap one or more labels of each replicated labeled packet with one or more labels of a respective outgoing element, and transmit the resulting labeled packet out of the interface identified in the respective outgoing element.

In the illustrated example, after LIB tables shown in FIGS. 3D, 3F, and 5D are created in LSRs A, B and C, respectively, any of these LSRs may receive labeled data packets associated with the MP2MP identified by MPLSP-Example. For example, suppose LSR I sends a labeled data packet to LSR C with label DSFLC attached thereto. LSR C searches entries in its LIB tables and finds that incoming element of the US entry of FIG. 3F, contains DSFLC. In response LSR C swaps DSFLA with CLA and FLA, which are contained in the outgoing element of the US entry. LSR C then sends the resulting labeled data packet, with both CLA and FLA attached thereto, out of interface 1 onto LAN 24. It is noted the resulting labeled packet, when sent out of interface 1, may be contained in a frame that contains a frame header. The frame header may contain a source MAC address and/or a destination MAC address. The switch of LAN 24, in response, forwards a copy of the frame that contains the labeled data packet, out of each of its ports, except the port that is coupled to LSR C. Thus, both LSRs A and B receive a copy of the labeled data packet with labels CLA and FLA attached thereto. Thereafter both LSRs A and B can implement a swap operation in response to receiving the labeled data packet with labels CLA and FLA attached thereto. Namely, LSR A searches entries in its LIB tables and finds that incoming element of the US entry of FIG. 5D, contains both labels CLA and FLA. In response LSR A swaps CLA and FLA with USFLF, which is contained in the outgoing element of the US entry. LSR A then sends the resulting labeled data packet, with USFLF attached thereto, out of interface 1 to LSR F. Similarly, LSR B searches entries in its LIB tables and finds that incoming element of the DS entry of FIG. 3D, contains both labels CLA and FLA. In response LSR B swaps CLA and FLA with USFLE, which is contained in the outgoing element of the DS entry. LSR B then sends the resulting labeled data packet, with USFLD attached thereto, out of interface 21 to LSR D.

Figure 6:
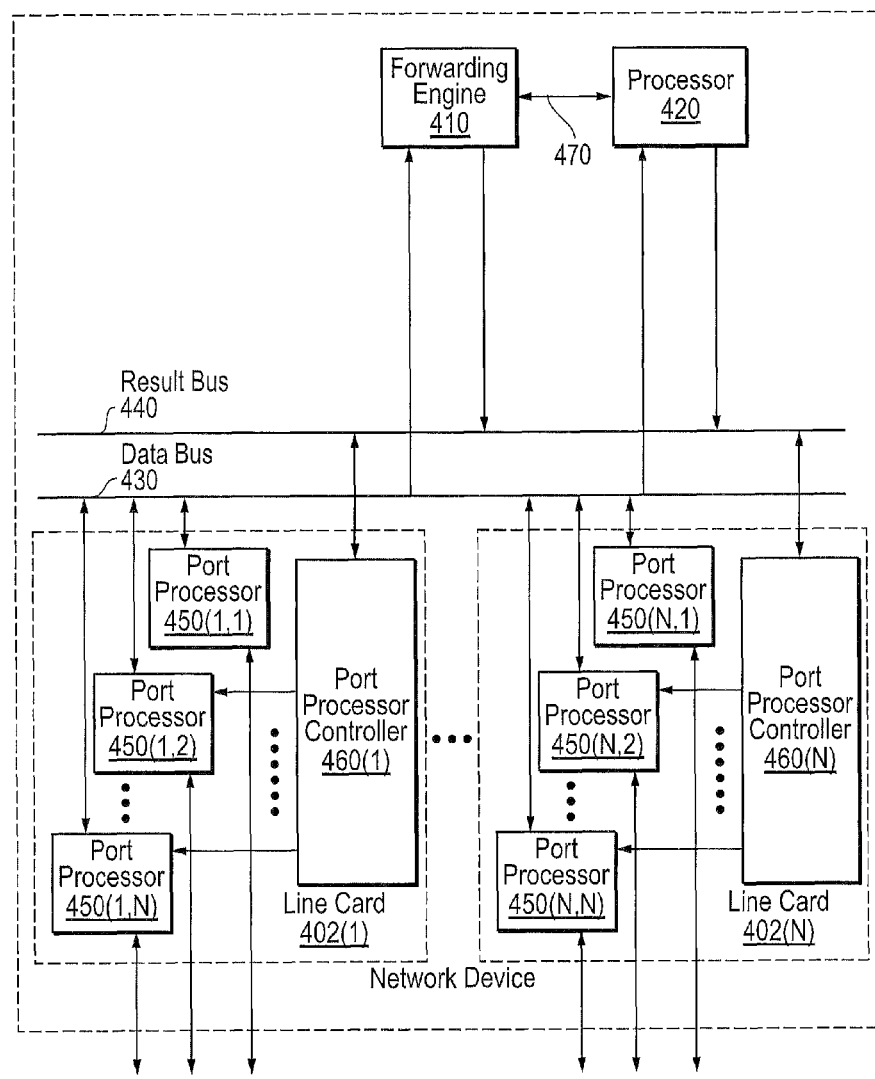
FIG. 6 is a simplified block diagram of a router. The use of the same reference symbols in different drawings indicates similar or identical items.

FIG. 6 is a simplified block diagram illustrating one example of an LSR. In this depiction, LSR 400 includes a number of line cards (line cards 402(1)-(N)) that are communicatively coupled to a forwarding engine 410 and a processor 420 via a data bus 430 and a result bus 440. Line cards 402(1)-(N) include a number of port processors 450(1,1)-(N, N) which are controlled by port processor controllers 460(1)-(N). It will also be noted that forwarding engine 410 and processor 420 are not only coupled to one another via data bus 430 and result bus 440, but are also communicatively coupled to one another by a communications link 470.

The processors 450 and 460 of each line card 402 may be mounted on a single printed circuit board. When a packet is received, the packet may be identified and analyzed by a network routing device such as network routing device 400 in the following manner. Upon receipt, a packet (or some or all of its control information) may be sent from the one of port processors 450(1,1)-(N,N) at which the packet was received to one or more of those devices coupled to data bus 430 (e.g., others of port processors 450(1,1)-(N,N), forwarding engine 410 and/or processor 420). Handling of the packet can be determined, for example, by forwarding engine 410. For example, forwarding engine 410 may determine that the packet should be forwarded to one or more of port processors 450(1,1)-(N,N). This can be accomplished by indicating to corresponding one(s) of port processor controllers 460(1)-(N) that the copy of the packet held in the given one(s) of port processors 450(1,1)-(N,N) should be forwarded to the appropriate one of port processors 450(1,1)-(N,N).

In the foregoing process, network security information can be included in a frame sourced by LSR 400 in a number of ways. For example, forwarding engine 410 can be used to detect the need for the inclusion of network security information in the packet, and processor 420 can be called into service to provide the requisite network security information. This network security information can be included in the packet during the transfer of the packet's contents from one of port processors 450(1,1)-(N,N) to another of port processors 450 (1,1)-(N,N), by processor 420 providing the requisite information directly, or via forwarding engine 410, for example. The assembled packet at the receiving one of port processors 450(1,1)-(N,N) can thus be made to contain the requisite network security information.

In addition, or alternatively, once a packet has been identified for processing, forwarding engine 410, processor 420 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
a first router receiving a context label and a forwarding label from a second router, wherein
the first and second routers are coupled to a LAN,
the second router is an upstream router to the first router, and
the context label distinguishes the second router that is coupled to the LAN from other routers coupled to the LAN;
the first router receiving a first incoming labeled data packet, wherein
the first incoming labeled data packet comprises a first data packet and one or more first labels;
the first router creating a first outgoing labeled data packet, wherein
the creating the first outgoing labeled data packet comprises an act of swapping the one or more first labels of the first incoming labeled data packet with the context label and the forwarding label, and
the first outgoing labeled data packet comprises the first data packet, the context label, and the forwarding label;
a LAN switch receiving a first frame at a first LAN port that is coupled to the first router, wherein
the first frame comprises the first outgoing labeled data packet, and
the first frame comprises a MAC address; and
the LAN switch transmitting a copy of the first frame out of second and third LAN ports that are coupled to the second router and a third router, respectively.

2. A method comprising:
a first router receiving a context label and a forwarding label from a second router, wherein
the first and second routers are coupled to a LAN,
the second router is an upstream router to the first router, and
the context label distinguishes the second router that is coupled to the LAN from other routers coupled to the LAN;
the first router receiving a first incoming labeled data packet, wherein
the first incoming labeled data packet comprises a first data packet and one or more first labels;
the first router creating a first outgoing labeled data packet, wherein
the creating the first outgoing labeled data packet comprises an act of swapping the one or more first labels of the first incoming labeled data packet with the context label and the forwarding label, and the first outgoing labeled data packet comprises the first data packet, the context label, and the forwarding label;

the second router receiving the first outgoing labeled data packet;

the second router creating a second outgoing labeled data packet, wherein the creating the second outgoing labeled data packet comprises an act of swapping the context and forwarding labels of the first outgoing labeled data packet with a second context label and a second forwarding label, the second outgoing labeled data packet comprises the first data packet, the second context label, and the second forwarding label; and the second router transmitting the second outgoing labeled data packet to another router via a second LAN.

3. The method of claim 2, further comprising:

a switch of the LAN generating a copy of the first outgoing labeled data packet; and the LAN transmitting the copy to the second router.

4. The method of claim 2, further comprising:

the first router transmitting the first outgoing labeled data packet to a third router via the LAN.

5. The method of claim 4, further comprising:

the third router receiving a second incoming labeled data packet, wherein the second incoming labeled data packet comprises a second data packet and one or more second labels;

the third router creating a third outgoing labeled data packet, wherein the creating the third outgoing labeled data packet comprises an act of swapping the one or more second labels of the second incoming labeled data packet with the context label and the forwarding label, and the third outgoing labeled data packet comprises the second data packet, the context label, and the forwarding label;

the third router transmitting the third outgoing labeled data packet to the LAN; and the LAN transmitting the third outgoing labeled data packet and a copy thereof to the first and second routers.

6. The method of claim 2, further comprising:

a LAN switch receiving a first frame at a first LAN port that is coupled to the first router, wherein the first frame comprises the first outgoing labeled data packet, and the first frame comprises a MAC address; and the LAN switch transmitting a copy of the first frame out of second and third LAN ports that are coupled to the second router and a third router, respectively.

7. An apparatus comprising:

means for receiving, at a first router, a context label and a forwarding label from a second router, wherein the first and second routers are coupled to a LAN, the second router is an upstream router to the first router, and the context label distinguishes the second router that is coupled to the LAN from other routers coupled to the LAN;

means for receiving a first incoming labeled data packet, wherein the first incoming labeled data packet comprises a first data packet and one or more first labels;

means for creating a first outgoing labeled data packet, wherein the creating the first outgoing labeled data packet comprises an act of swapping the one or more first labels of the first incoming labeled data packet with the context label and the forwarding label, and the first outgoing labeled data packet comprises the first data packet, the context label, and the forwarding label;

means for receiving the first outgoing labeled data packet;

means for creating a second outgoing labeled data packet, wherein the creating the second outgoing labeled data packet comprises an act of swapping the context and forwarding labels of the first outgoing labeled data packet with a second context label and a second forwarding label, the second outgoing labeled data packet comprises the first data packet, the second context label, and the second forwarding label; and means for transmitting the second outgoing labeled data packet to another router via a second LAN.

8. The apparatus of claim 7, further comprising:

means for generating a copy of the first outgoing labeled data packet; and means for transmitting the copy to the second router.

9. The apparatus of claim 7, further comprising:

means for transmitting the first outgoing labeled data packet to a third router via the LAN.

10. The apparatus of claim 9, further comprising:

means for receiving a second incoming labeled data packet, wherein the second incoming labeled data packet comprises a second data packet and one or more second labels;

means for creating a third outgoing labeled data packet, wherein the creating the third outgoing labeled data packet comprises an act of swapping the one or more second labels of the second incoming labeled data packet with the context label and the forwarding label, and the third outgoing labeled data packet comprises the second data packet, the context label, and the forwarding label;

means for transmitting the third outgoing labeled data packet to the LAN; and means for transmitting the third outgoing labeled data packet and a copy thereof to the first and second routers.

11. The apparatus of claim 7, further comprising:

means for receiving a first frame at a first LAN port that is coupled to the first router, wherein the first frame comprises the first outgoing labeled data packet, and the first frame comprises a MAC address; and means for transmitting a copy of the first frame out of second and third LAN ports that are coupled to the second router and a third router, respectively.

* * * * *